United States Patent
Evans et al.

(10) Patent No.: US 9,630,188 B2
(45) Date of Patent: Apr. 25, 2017

(54) DEVICE AND METHOD FOR DECOKE EFFLUENT PROCESSING

(71) Applicant: Technip Stone & Webster Process Technology, Inc., Claremont, CA (US)

(72) Inventors: Bruce Evans, Claremont, CA (US); Qingqi "Harry" Wang, Claremont, CA (US)

(73) Assignee: Technip Stone & Webster Process Technology, Inc., Claremont, CA (US)

( * ) Notice: Subject to any disclaimer, the term of this patent is extended or adjusted under 35 U.S.C. 154(b) by 90 days.

(21) Appl. No.: 14/070,404

(22) Filed: Nov. 1, 2013

(65) Prior Publication Data

US 2016/0024387 A1    Jan. 28, 2016

(51) Int. Cl.
   *B04C 5/185*    (2006.01)
   *C10G 9/16*    (2006.01)
   *B01D 45/16*    (2006.01)

(52) U.S. Cl.
   CPC ............... *B04C 5/185* (2013.01); *C10G 9/16* (2013.01); *B01D 45/16* (2013.01)

(58) Field of Classification Search
   None
   See application file for complete search history.

(56) References Cited

U.S. PATENT DOCUMENTS

| | | | |
|---|---|---|---|
| 3,729,105 A * | 4/1973 | Huebler ............ | B65G 53/4691 208/173 |
| 4,838,898 A * | 6/1989 | Mifflin .................. | C10J 3/466 110/165 A |
| 5,032,143 A * | 7/1991 | Ritakallio ............. | B01D 46/38 23/313 FB |
| 5,183,642 A * | 2/1993 | Lenglet .................... | F28G 1/12 110/216 |
| 7,914,668 B2 * | 3/2011 | Siskin ...................... | C10B 1/04 208/131 |
| 8,025,717 B2 * | 9/2011 | Dries .................. | C10G 11/182 422/139 |
| 2006/0144231 A1* | 7/2006 | Borley .................. | B01D 45/16 95/271 |
| 2007/0004952 A1* | 1/2007 | McCoy .................... | C10G 9/00 585/648 |
| 2008/0142411 A1* | 6/2008 | Barendregt ............. | C10G 9/20 208/132 |
| 2009/0020459 A1* | 1/2009 | De Haan .................. | C10G 9/16 208/48 R |
| 2010/0063342 A1* | 3/2010 | Spicer ..................... | B01J 8/062 585/652 |

OTHER PUBLICATIONS

Wang, H. et al., "A New Decoke Scheme for Ethylene Cracking Furnaces to Meet the Challenges of Stringent Environmental Emission," Technip Inaugural Ethylene Forum, pp. 1-28 (Nov. 4, 2013).

* cited by examiner

*Primary Examiner* — Duane Smith
*Assistant Examiner* — Phillip Shao
(74) *Attorney, Agent, or Firm* — Locke Lord LLP; Alan B. Clement; Peter J. Fallon

(57) ABSTRACT

A device and method for processing decoke effluent to remove particulate matter and pollutant gases is provided, with particular concern for meeting ever more stringent environmental standards.

14 Claims, 2 Drawing Sheets

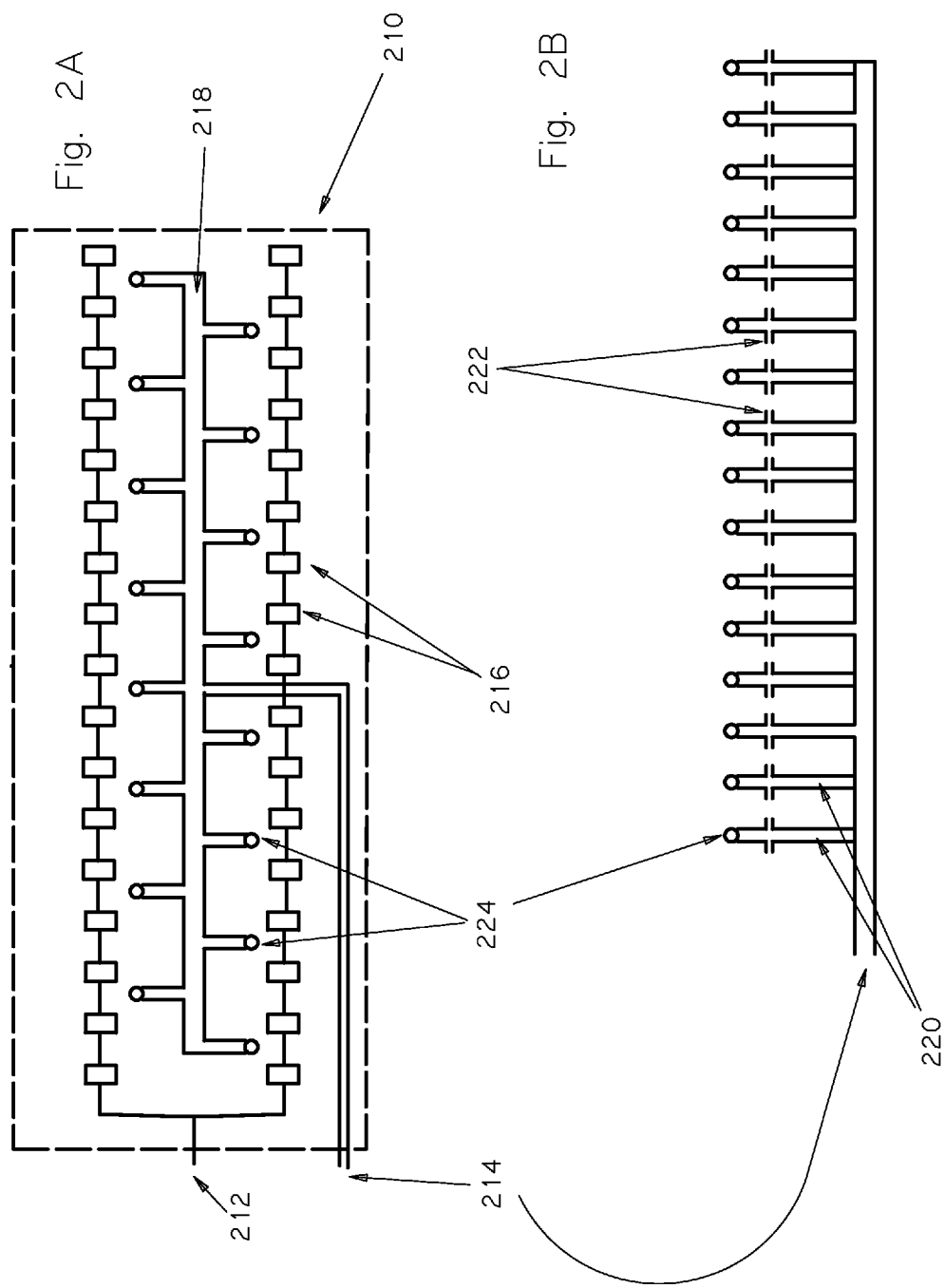

DEVICE AND METHOD FOR DECOKE EFFLUENT PROCESSING

FIELD OF THE INVENTION

The invention pertains to a device and method for processing decoking effluent that efficiently minimizes nitrogen oxides, carbon monoxide, and particulate matter.

BACKGROUND OF THE INVENTION

Ethylene is the building block of the petrochemical industry. Cracking furnaces are the heart of an ethylene plant, producing hydrogen, methane, ethylene, propylene, butadiene, and other cracked gases.

A fundamental issue with thermal cracking of hydrocarbons is coke formation and deposition inside the radiant coils and also inside the inner tubes of the transfer line exchangers along the run. Coke formation results in the need to periodically decoke a furnace. Decoke is required when radiant coil inlet venturi pressure ratio ("VPR") reaches the end of run limit ("EOR") for uniform flow distribution through the coils or maximum tube metal temperature ("MTMT") of the radiant coils at EOR is reached in any one of the radiant coils.

Decoke air together with dilution steam or medium pressure steam is often used during the decoking process to remove coke deposited in the radiant coils. During furnace decoke, two types of decoking process are traditionally applied; either decoke effluent from the last transfer line exchanger is directly routed to the bottom of the firebox for combustion of coke particles with combustion air, or decoke effluent from the last transfer line exchanger is directly routed to the decoke cyclone for separating coke particles from decoke air and steam. After coke removal, decoke effluent goes to atmosphere via a vent stack. Coke is collected at the bottom of the decoke cyclone.

However, emission requirements have become extremely stringent to comply with Environmental Protection Agency ("EPA") and National Ambient Air Quality Standard ("NAAQS") requirements. An ethylene plant cannot be built if the emission requirements are not satisfied.

The size of emitted particles is directly linked to their potential for causing health problems. Particles less than 10 microns ("$PM_{10}$") pose the greatest problem for health as they can get deep into the lungs and reach the bloodstream.

Ethylene cracking furnaces also produce flue gas containing pollutants such as nitrogen oxides (NO and $NO_2$), carbon monoxide (CO) and particulate matter. The increasingly stringent environmental regulations in the United States and elsewhere require new control methods to minimize these atmospheric pollutants, including particulate matter with a diameter of 2.5 μm or less ("$PM_{2.5}$"). For example, recent requirements for projects along the United States gulf coast have required not more than 0.01 Lb/MM Btu (HHV basis) or 10 PPMV (dry basis) of $NO_x$, 0.0025 Lb/MMBtu (HHV) of total $PM_{10}+PM_{2.5}$, and 0.012 Lb/MMBtu (HHV) of carbon monoxide. Such controls are needed during normal cracking mode and also during steam plus air decoke mode.

Based on current ultra-low $NO_x$ burner technology, it is impossible to achieve the Lowest Achievable Emission Rate standard of 0.01 Lb/MMbtu (HHV) of $NO_x$ in an ethylene cracking furnace stack. To achieve this standard, a selective catalytic reduction ("SCR") unit integrated with an ammonia injection grid ("AIG") must be installed in the convection section of the furnace.

Another furnace emission is the decoke effluent. Conventional decoking passes the effluent through a decoke separator then vents it to atmosphere. This approach probably cannot meet the standards for CO removal and also has limited ability to remove $PM_{2.5}$.

An alternative process involving routing decoke effluent to the firebox also cannot achieve the requirements for complete particle removal. This is particularly true during furnace decoke. Further, using such a process in cracking furnaces integrated with an SCR unit in the convection section may foul the SCR catalyst.

Accordingly, it is desirable to provide a decoke unit for ethylene cracking furnaces that meet new and anticipated standards for the removal of nitrogen oxides, carbon monoxide, and particulate matter. It is further desirable that such a decoke unit be compatible with existing technology such as SCR units.

SUMMARY OF THE INVENTION

The invention comprises equipment for and a method of routing decoke effluent from the outlet of a furnace decoke motor operated valve ("MOV") to a specially designed decoke system. The decoke system comprises a decoke cyclone unit integrated with a lock hopper and valves. The decoke cyclone acts to remove most coke particles from the decoke effluent into the lock hopper. The decoke effluent is preferably oriented to make a tangential entry into the decoke cyclone. Optionally, one or more additional cyclones may be used, in parallel or in series, to further eliminate coke particles from the decoke effluent.

A lock hopper is connected to the bottom of each decoke cyclone by one or more valves, such as knife gate valves or other type of valve suitable for solids handling at high temperatures that can provide an adequate seal to isolate the lock hopper from the decoke cyclones. This valve (or valves) between the decoke cyclone and lock hopper provide solids handling control to discharge the stream containing coke particles. Optionally, the valve or valves may have water wash or steam wash capabilities to periodically clean the valves to prevent coke particles from plugging them or restricting operations.

To provide fully automatic operations during decoking, the valves are preferably equipped with actuators or motor driven. During decoke mode, valves between the decoke cyclone and lock hopper must be open so that coke is collected in the lock hopper. During normal cracking mode, valves between the decoke cyclone and lock hopper are normally closed but can be opened occasionally for water washing purposes. During coke unloading during normal cracking mode, the valves between the decoke cyclone and lock hopper must be closed to avoid back flow from the firebox to decoke cyclone and then to the lock hopper, to avoid damage or injury in case the furnace firebox reaches its high pressure trip set point during operation. An interlock is preferably provided so that the valve located at the outlet of lock hopper can never be open if the valves between the decoke cyclone and lock hopper are not closed.

Secondary decoke effluent from the top gas outlet of the decoke cyclone (or the last cyclone, if multiple cyclones are used) is routed to a piping system at the bottom of the furnace firebox for full particle combustion, and to remove both CO and $PM_{2.5}$ successfully. This piping system is specifically designed to avoid interference with furnace burner operation and efficiency, and may be engineered to accommodate the specific size and flow needs of a particular plant design without departing from the spirit of the invention.

As discussed below, a computational fluid dynamics ("CFD") modeling demonstrates both CO and $PM_{2.5}$ destruction using the design of the present invention.

In this design, no external injection or treatment is required for the decoke effluent prior to entering the decoke cyclone. Additionally, there is no water/steam injection to the decoke effluent line before entering the decoke cyclone. Normal operating temperatures and pressures range from 300 to 750° F. and 1 to 5 psig, respectively.

EXAMPLE

A conceptual study of coke combustion and CO destruction was done by CFD. The objectives of the study were to observe CO content changes in the firebox by calculating CO amounts at the firebox inlet and outlets, and to observe the fate of coke particles within the firebox, calculating the combustion and coke travel residence time within the firebox and any entrainment and coke escape into the convection section. Coke particles were approximated as carbon particles with carbon's physical properties and combustion characteristics.

The model used a typical particle size distribution. All radiant pyrolysis tubes were assumed to be uniform in temperature at around 1500° F. The reaction:

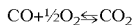

was treated as reversible, with an activation energy of 21,700 Btu/Lb·mol, and a pre-exponential factor of 2.0E9 for the forward rate coefficient.

Result:

With a CO mole fraction at the decoke nozzle inlets of 0.00963, the CFD model indicates that the mole fraction of CO at the outlet will be $2.166 \cdot 10^{-8}$, or effectively zero. Accordingly, CFD indicates that the present invention will combust 99.999% of CO. Additionally, coke particles are fully combusted by the time they reach approximately fifty percent of the firebox height.

Thus, the present invention provides a means of meeting newer emission standards during decoke operations.

BRIEF DESCRIPTION OF THE DRAWINGS

FIG. 2A is a schematic bottom view of a furnace box of the present invention.

FIG. 2B is a schematic side view of the manifold, risers, flow restrictors, and nozzles of the present invention.

DETAILED DESCRIPTION

Figure 1:
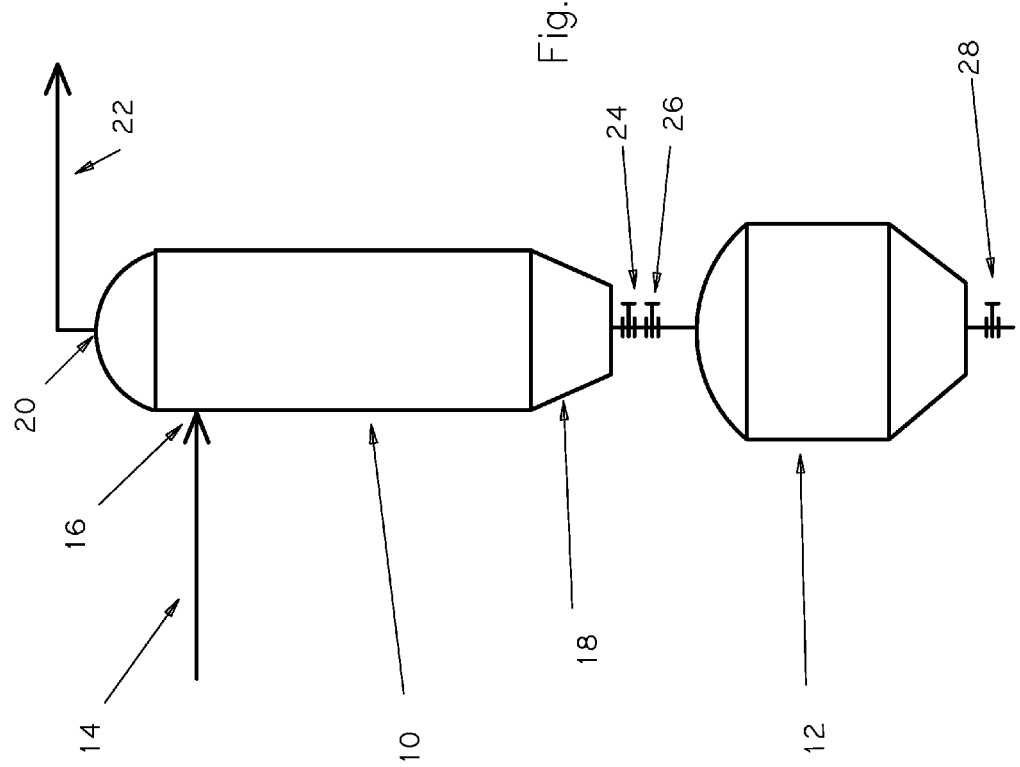
FIG. 1 is a schematic side view of a cyclone and lock hopper combination of the present invention.

Referring to FIG. 1, cyclone 10 receives raw de-coke effluent via inlet pipe 14 to cyclone inlet 16, which is preferably a tangential entry into cyclone 10. Heavier coke particles settle in cyclone 10 into cyclone lower section 18, where they are transferred via first lock valve 24 and second lock valve 26 into lock hopper 12. When it is desirable to remove the accumulated coke from lock hopper 12, lock hopper valve 28 may be opened and the accumulated coke removed.

Those of skill in the art will understand that one or more cyclones 10, coupled with one or more lock hoppers 12, may be used in any combination, only with regard to engineering need. The lighter effluent from such combinations may be used in this invention without departing from the spirit thereof.

Lighter effluent, including unwanted gases (CO & $NO_x$) exit cyclone 10 through cyclone flue 20, and into treated effluent header 22 to a furnace box (210 of FIGS. 2A and 2B).

Referring now to FIGS. 2A and 2B, furnace box 210 receives treated effluent through inlet port 214. Furnace box 210 comprises furnace fuel gas inlet 212, providing fuel gas to multiple burners 216. Treated effluent passes through inlet port 214 into manifold 218, and into staggered risers 220. Treated effluent passing through staggered risers 220 may pass through flow restrictors 222 (present on one or more of risers 220 for flow balance). Staggered risers 220 pass treated effluent to nozzles 224 for ejection into the furnace box 210, without disruption of the furnace burners' function. Innocuous final combustion gas exits as furnace flue gas into the convection section.

Those of skill in the art will recognize that the design of manifold 218, risers 220, flow restrictors 222, and nozzles 224 may be altered to optimize conditions for a particular installation without departing from the spirit of the invention.

We claim:

1. A device for removing particulate matter and pollutant gases from decoke effluent, comprising a decoke cyclone, comprising a decoke effluent inlet, a secondary gas outlet, and a solids outlet, a lock hopper in selective communication with said solids outlet of said decoke cyclone, and a furnace, in fluid communication with said secondary gas outlet of said decoke cyclone, wherein said furnace comprises a plurality of burners and wherein particulate matter and pollutant gases contained in outlet gas of said decoke cyclone are introduced into said furnace via a plurality of risers staggered with respect to said burners.

2. The device of claim 1, wherein at least one of said risers comprises a flow restrictor.

3. The device of claim 1, wherein said selective communication between said decoke cyclone and said lock hopper comprises a valved connection.

4. The device of claim 3, wherein said valved connection comprises a plurality of valves.

5. The device of claim 3, wherein said valved connection is remotely controllable.

6. The device of claim 1, wherein said lock hopper comprises a selectively controllable solids outlet.

7. The device of claim 5, wherein said lock hopper comprises a selectively controllable solids outlet.

8. The device of claim 7, wherein said selectively controllable solids outlet of said lock hopper comprises a remotely controllable valved outlet.

9. A method for removing particulate matter and pollutant gases from decoke effluent, comprising the steps of introducing decoke effluent into a decoke cyclone comprising a solids discharge outlet, discharging solids from said decoke cyclone into a lock hopper through said solids discharge outlet, discharging outlet gas containing small particulate matter and pollutant gases from said decoke cyclone to a furnace comprising a plurality of burners and a decoke gas manifold, wherein said decoke gas manifold comprises a plurality of risers, and discharging said outlet gas from said risers into said furnace.

10. The method of claim 9, additionally comprising the step of restricting flow through at least one of said risers.

11. The method of claim 10, additionally comprising the step of balancing the flow rate through said risers to provide substantially uniform distribution of said outlet gas in the furnace.

12. The method of claim 9, additionally comprising the step of positioning said risers in said furnace to release said outlet gas between the positions of pairs of said burners.

13. The method of claim 9, additionally comprising the step of selectively discharging solids from said lock hopper.

14. The method of claim 9, additionally comprising the step of selectively closing the solids discharge outlet of said decoke cyclone.

* * * * *